(12) United States Patent
Motoki et al.

(10) Patent No.: US 8,149,566 B2
(45) Date of Patent: Apr. 3, 2012

(54) LAMINATED ELECTRONIC COMPONENT AND MANUFACTURING METHOD THEREFOR

(75) Inventors: Akihiro Motoki, Fukui (JP); Makoto Ogawa, Fukui (JP); Kenichi Kawasaki, Echizen (JP); Shunsuke Takeuchi, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 60 days.

(21) Appl. No.: 12/781,058

(22) Filed: May 17, 2010

(65) Prior Publication Data

US 2010/0290172 A1  Nov. 18, 2010

(30) Foreign Application Priority Data

May 18, 2009  (JP) ................................. 2009-119687

(51) Int. Cl.
*H01G 4/008* (2006.01)
(52) U.S. Cl. .................. 361/305; 361/321.1; 361/321.5; 361/311; 361/313; 361/321.2
(58) Field of Classification Search .................. 361/303, 361/305, 309, 311–313, 321.1, 321.2, 321.4, 361/306.1, 306.3
See application file for complete search history.

(56) References Cited

U.S. PATENT DOCUMENTS

| | | | |
|---|---|---|---|
| 5,712,758 A * | 1/1998 | Amano et al. | 361/321.2 |
| 6,344,963 B1 * | 2/2002 | Mori | 361/306.3 |
| 6,356,430 B1 * | 3/2002 | Yoshida et al. | 361/305 |
| 6,898,069 B2 * | 5/2005 | Yamaguchi et al. | 361/303 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |

(Continued)

FOREIGN PATENT DOCUMENTS

CN  1379421 A  11/2002

(Continued)

OTHER PUBLICATIONS

Official Communication issued in corresponding Korean Patent Application No. 10-2010-0044830, mailed on Jul. 27, 2011.

(Continued)

*Primary Examiner* — Nguyen T Ha
(74) *Attorney, Agent, or Firm* — Keating & Bennett, LLP (57) ABSTRACT

A method for manufacturing a laminated electronic component includes the steps of preparing a component main body having a laminated structure, the component main body including a plurality of internal electrodes formed therein, and each of the internal electrodes being partially exposed on an external surface of the component main body, and forming an external terminal electrode on the external surface of the component main body such that the external terminal electrode is electrically connected to the internal electrodes. The step of forming the external terminal electrode includes the steps of forming a first plating layer on exposed surfaces of the internal electrodes of the component main body, applying a water repellant at least on a surface of the first plating layer and on a section in the external surface of the component main body at which an end edge of the first plating layer is located, and then forming a second plating layer on the first plating layer having the water repellant applied thereon.

8 Claims, 3 Drawing Sheets

U.S. PATENT DOCUMENTS

| | | | |
|---|---|---|---|
| 7,295,421 B2 * | 11/2007 | Mihara et al. | 361/308.1 |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,719,819 B2 * | 5/2010 | Motoki et al. | 361/321.2 |
| 2003/0007314 A1 | 1/2003 | Sanada et al. | |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0151470 A1 | 6/2008 | Motoki et al. | |
| 2008/0158774 A1 | 7/2008 | Trinh | |
| 2008/0210564 A1 | 9/2008 | Motoki et al. | |

FOREIGN PATENT DOCUMENTS

| | | |
|---|---|---|
| JP | 63-169014 A | 7/1988 |
| JP | 07-029773 A | 1/1995 |
| JP | 10-214741 A | 8/1998 |
| JP | 2002-289465 A | 10/2002 |
| JP | 2004-146401 A | 5/2004 |
| WO | 2007/119281 A1 | 10/2007 |
| WO | 2008/059666 A1 | 5/2008 |

OTHER PUBLICATIONS

Motoki et al.; "Laminated Electronic Component and Method for Manufacturing the Same"; U.S. Appl. No. 12/043,225, filed Mar. 6, 2008.

Motoki et al.; "Multilayer Electronic Component and Method for Manufacturing the Same"; U.S. Appl. No. 12/263,556, filed Nov. 3, 2008.

Saruban et al., "Laminated Electronic Component and Manufacturing Method Therefor", U.S. Appl. No. 13/020,886, filed Feb. 4, 2011.

Official Communication issued in corresponding Chinese Patent Application No. 201010170076.0, mailed on Dec. 5, 2011.

* cited by examiner

LAMINATED ELECTRONIC COMPONENT AND MANUFACTURING METHOD THEREFOR

BACKGROUND OF THE PRESENT INVENTION

1. Field of the Present Invention

The present invention relates to a laminated electronic component and a method for manufacturing the laminated electronic component, and more particularly, to a laminated electronic component with external terminal electrodes formed directly by plating so as to be electrically connected to a plurality of internal conductors, and to a method for manufacturing the laminated electronic component.

2. Description of the Related Art

Figure 3:
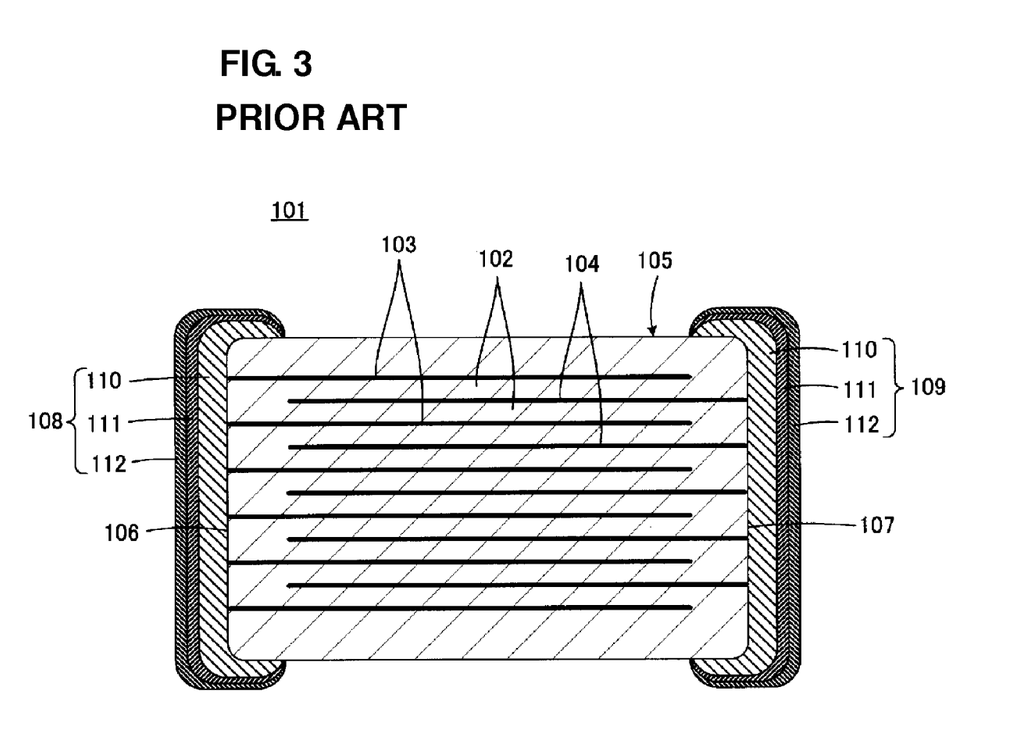
FIG. 3 is a cross-sectional view of a conventional laminated electronic component.

As shown in FIG. 3, a laminated electronic component 101 typified by a laminated ceramic capacitor generally includes a component main body 105 having a laminated structure, which includes a plurality of laminated insulator layers 102 composed of, for example, a dielectric ceramic, and a plurality of layered internal electrodes 103 and 104 provided along interfaces between the adjacent insulator layers 102. Respective ends of the plurality of internal electrodes 103 and respective ends of the plurality of internal electrodes 104 are exposed at one end surface and the other end surfaces 106 and 107 of the component main body 105, and external terminal electrodes 108 and 109 are respectively arranged so as to electrically connect the respective ends of the internal electrodes 103 to each other and the respective ends of the internal electrodes 104 to each other.

For the formation of the external terminal electrodes 108 and 109, in general, a metal paste containing a metal component and a glass component is applied onto the end surfaces 106 and 107 of the component main body 105, and then baked, thereby forming paste electrode layers 110. Next, first plating layers 111 primarily including, for example, nickel are formed on the paste electrode layers 110, respectively, and second plating layers 112 primarily including, for example, tin or gold are further formed thereon. Thus, each of the external terminal electrodes 108 and 109 is formed in a three-layer structure including the paste electrode layer 110, the first plating layer 111, and the second plating layer 112.

The external terminal electrodes 108 and 109 are required to have excellent solderability when the laminated electronic component 101 is mounted on a substrate via solder. At the same time, the external terminal electrode 108 is required to electrically connect the plurality of internal electrodes 103 which are electrically insulated from each other, and the external terminal electrode 109 is required to electrically connect the plurality of internal electrodes 104 which are electrically insulated from each other. The second plating layers 112 described above ensure the solderability, whereas the paste electrode layers 110 electrically connect the internal electrodes 103 to each other and the internal electrodes 104 to each other. The first plating layers 111 prevent solder erosion in the solder joint.

However, the paste electrode layer 110 has a relatively large thickness from several tens of μm to several hundreds of μm. Therefore, in order to limit the dimensions of the laminated electronic component 101 within certain specifications, there is a need to reduce the effective volume for ensuring a capacitance because the volumes of the paste electrode layers 110 must be maintained. On the other hand, the plating layers 111 and 112 have a thickness on the order of several μm. Thus, if the external terminal electrodes 108 and 109 can be composed only of the first plating layers 111 and the second plating layers 112, the effective volume for ensuring the capacitance can be increased.

For example, Japanese Unexamined Patent Publication No. 2004-146401 discloses a method in which a conductive paste is applied to at least ridge sections of end surfaces of a component main body along the direction of laminating internal electrodes so as to come into contact with leading sections of the internal electrodes, the conductive paste is baked or thermally cured to form a conductive film, and further, the end surfaces of the component main body are subjected to electroplating, thereby forming an electroplating film so as to be connected to the conductive film on the ridge sections. According to this method, external terminal electrodes at the end surfaces can be reduced in thickness.

Furthermore, Japanese Unexamined Patent Publication No. 63-169014 discloses a method in which a conductive metal film is deposited by electroless plating on the entire sidewall surface of a component main body, at which internal electrodes are exposed, so as to short circuit the internal electrodes exposed at the sidewall surface.

However, in the methods for forming external terminal electrodes as described in Japanese Unexamined Patent Publication No. 2004-146401 and Japanese Unexamined Patent Publication No. 63-169014, plating is performed directly on the ends at which the internal electrodes are exposed. Thus, a plating solution entering the component main body along the interfaces between the internal electrodes and the insulator layers may erode the ceramic defining the insulator layers and the internal electrodes, thereby causing structural defects. Furthermore, this causes defects in terms of reliability, such as degraded load characteristics against humidity for the laminated electronic component.

In particular, when tin or gold plating is to be applied, the problems described above are more likely to occur because a tin or gold plating solution generally contains a highly corrosive complexing agent.

In order to solve the problems described above, for example, International Publication No. WO2007/119281 suggests providing a water repellent on end surfaces of a component main body at which respective ends of internal electrodes are exposed, to fill gaps at interfaces between insulator layers and the internal electrodes with this water repellent, and then forming plating layers as bases of external terminal electrodes onto the end surfaces. The application of such a water repellent can improve the lifetime characteristics in the load test against humidity.

However, the technique described in International Publication No. WO2007/119281 has the following problems.

The water repellent is likely to adhere to the ceramic sections provided from the insulator layers rather than the metal sections provided from the internal electrodes. If the distance between the internal electrodes is relatively large (that is, when the insulator layers are thick and the number of laminated internal electrodes is small), most portions of the end surfaces at which the respective ends of the internal electrodes are exposed will be covered with the water repellent, thereby decreasing the depositions plated on the end surfaces at which the internal electrodes are exposed.

Furthermore, for the purpose of enhancing the fixing strength of the external terminal electrodes to the component main body, a heat treatment may be performed at a temperature o of 800° C. or more after the formation of the plating layers as bases. However, such a heat treatment will cause the water repellent to disappear.

It is to be noted that, for example, Japanese Unexamined Patent Publication No. 2002-289465 discloses providing a water repellent before a plating process, in a case of forming paste electrode layers by baking and then performing plating as in the conventional art described with reference to FIG. 3, rather than forming external terminal electrodes substantially only by plating. The paste electrode layers formed by baking are not only formed on end surfaces of a component main body in the shape of a rectangular parallelepiped, at which the respective ends of internal electrodes are exposed, but also formed such that the end edges of the paste electrode layers are located on principal surfaces and side surfaces adjacent to the end surfaces.

However, the technique described in Japanese Unexamined Patent Publication No. 2002-289465 encounters the following problem. Moisture is likely to enter through the gap between the end edges of the paste electrode layers formed by baking and the component main body, because segregation of a glass component is likely to occur in the gaps and glass is easily dissolved by the plating solution even if the glass is coated with the water repellent.

SUMMARY OF THE PRESENT INVENTION

To overcome the problems described above, preferred embodiments of the present invention provide a method for manufacturing a laminated electronic component and a laminated electronic component manufactured in accordance with the manufacturing method mentioned above.

A preferred embodiment of the present invention provides a method for manufacturing a laminated electronic component including the steps of preparing a component main body having a laminated structure, the component main body including a plurality of internal electrodes formed therein, and the internal electrodes each being partially exposed on an external surface of the component main body, and forming an external terminal electrode on the external surface of the component main body such that the external terminal electrode is electrically connected to the internal electrodes. In order to solve the technical problems described above, the step of forming the external terminal electrode includes the steps of forming a first plating layer on exposed surfaces of the internal electrodes of the component main body, applying a water repellant at least on a surface of the first plating layer and on a section in the external surface of the component main body, where an end edge of the first plating layer is located, and then forming a second plating layer on the first plating layer after the water repellant has been applied.

Preferably, the step of forming the external terminal electrode further includes the step of subjecting the component main body having the first plating layer formed thereon to a heat treatment, between the step of forming the first plating layer and the step of applying the water repellant.

Preferably, the step of forming the first plating layer includes the step of forming a plating layer primarily including copper, and the step of forming the second plating layer includes the step of forming a plating layer primarily including nickel and subsequently the step of forming a plating layer primarily including tin or gold.

Another preferred embodiment of the present invention provides a laminated electronic component including a component main body having a laminated structure, the component main body including a plurality of internal electrodes provided therein, and the internal electrodes each being partially exposed on an external surface of the component main body, and an external terminal electrode arranged on the external surface of the component main body such that the external terminal electrode is electrically connected to the internal electrodes. In the laminated electronic component according to this preferred embodiment of the present invention, the external terminal electrode includes a first plating layer provided on exposed surfaces of the internal electrodes of the component main body, a second plating layer provided on the first plating layer, and a water repellent film provided between the first plating layer and the second plating layer.

In the laminated electronic component according to this preferred embodiment of the present invention, preferably, an interdiffusion layer is provided in a region in the internal electrode with a length of about 2 μm or more, for example, from a boundary of the first plating layer.

In the laminated electronic component according to this preferred embodiment of the present invention, preferably, the first plating layer includes a plating layer primarily including copper, and the second plating layer includes a plating layer primarily including nickel and a plating layer thereon primarily including tin or gold.

Preferred embodiments of the present invention are particularly advantageously applied in a case in which the component main body has a substantially rectangular parallelepiped shape including a pair of principal surfaces opposed to each other, a pair of side surfaces opposed to each other, and a pair of end surfaces opposed to each other, the end surfaces defining the exposed surfaces of the internal electrodes, and the first plating layer is formed on the end surfaces such that end edges of the first plating layer are located on the principal surfaces and the side surfaces, which are adjacent to the end surfaces.

According to preferred embodiments of the present invention, the water repellent is provided after the formation of the first plating layer and before the formation of the second plating layer. More specifically, when the first plating layer is provided to electrically connect the plurality of internal electrodes to each other and the second plating layer is provided to improve the laminated electronic component in terms of mounting property, the water repellent is applied before the formation of the plating layer for improving mounting property. Therefore, the highly corrosive complexing agent for use in a plating solution for, for example, tin plating or gold plating, in order to improve mounting property is prevented from entering the inside of the component main body, thereby allowing the reliability of the laminated electronic component to be sufficiently ensured.

Furthermore, since the water repellent is applied after the formation of the first plating layer, a thin water repellent film can be formed uniformly on the first plating layer in the step of applying the water repellent. As a result, the water repellent adheres in the form of a relatively thick film to the section of the external surface of the component main body, where an end edge of the first plating layer is located, thereby effectively preventing moisture from entering through the gaps between the end edge of the first plating layer and the component main body.

For example, when the component main body has a substantially rectangular parallelepiped shape, the first plating layer is formed on the end surfaces of the component main body such that the end edge of the first plating layer is located on the principal surfaces and sides surfaces adjacent to the end surfaces, thereby effectively preventing moisture from entering through the gaps between the end edge of the first plating layer and the principal surfaces and the sides surfaces. The prevention of the entry of moisture will improve the reliability of the laminated electronic component.

Furthermore, since the water repellent film is thin and uniform on the first plating layer as described above, the problem of it being difficult to deposit a plating film is not likely to occur when forming the second plating layer.

In preferred embodiments of the present invention, if the component main body with the first plating layer formed thereon is subjected to a heat treatment between the step of forming the first plating layer and the step of applying the water repellent, the problem of the entry of moisture described above can be more reliably prevented. Furthermore, the problem of the disappearance of the water repellent due to the heat treatment will not occur.

These and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
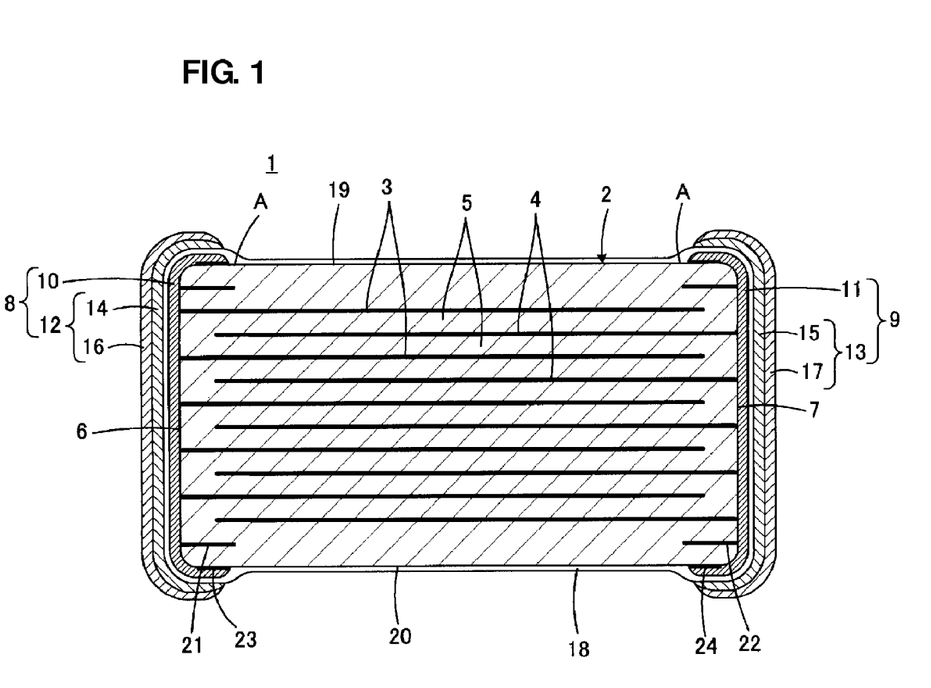
FIG. 1 is a cross-sectional view illustrating a laminated electronic component manufactured in accordance with a manufacturing method according to a preferred embodiment of the present invention.

In a method for manufacturing a laminated electronic component according to preferred embodiments of the present invention, the formation of external terminal electrodes is based on the application of plating directly onto end surfaces of a component main body at which internal electrodes are exposed, without including the formation of a paste electrode, a sputtered electrode, a deposited electrode, or other similar electrode. Further, a plating film includes at least two layers, and typically, a first plating layer is provided to electrically connect a plurality of internal electrodes to each other, and a second plating layer is provided thereon to improve the mounting properties of the laminated electronic component. In the method according to a preferred embodiment of the present invention, after the formation of the first plating layer and before the formation of the second plating layer, a water repellent is applied at least to a surface of the first plating layer and to a section of an external surface of the component main body at which an end edge of the first plating layer is located. FIG. 1 shows an example of the laminated electronic component thus obtained.

A laminated electronic component 1 includes a component main body 2 having a laminated structure. The component main body 2 includes a plurality of internal electrodes 3 and 4 provided therein. More specifically, the component main body 2 includes a plurality of laminated insulator layers 5, and a plurality of layered internal electrodes 3 and 4 provided along interfaces between the adjacent insulator layers 5.

When the laminated electronic component 1 defines a laminated ceramic capacitor, the insulator layers 5 are preferably composed of a dielectric ceramic. It is to be noted that the laminated electronic component 1 may define a different element such as an inductor, a thermistor, or a piezoelectric component, for example. Therefore, depending on the function of the laminated electronic component 1, the insulator layers 5 may be composed of a dielectric ceramic, a magnetic ceramic, a semiconductor ceramic, or a piezoelectric ceramic, or, may be composed of a material including a resin.

Ends of the plurality of internal electrodes 3 and ends of the plurality of internal electrodes 4 are exposed respectively at one and the other end surfaces 6 and 7 of the component main body 2, and external terminal electrodes 8 and 9 are respectively arranged so as to electrically connect the ends of the internal electrodes 3 to each other and the ends of the internal electrodes 4 to each other.

It is to be noted that, while the laminated electronic component 1 shown in FIG. 1 preferably is a two-terminal laminated electronic component provided with the two external terminal electrodes 8 and 9, preferred embodiments of the present invention can also be applied to multi-terminal laminated electronic components.

The external terminal electrodes 8 and 9 respectively include first plating layers 10 and 11 formed directly by plating on the surfaces of the component main body 2 at which the internal electrodes 3 and 4 are exposed, that is, on the end surfaces 6 and 7, and second plating layers 12 and 13 respectively formed on the first plating layers 10 and 11.

The first plating layers 10 and 11 are respectively provided to electrically connect the plurality of internal electrodes 3 and 4 to each other, and are preferably each composed of, for example, a plating layer primarily including copper. On the other hand, the second plating layers 12 and 13 are provided to improve the mounting property of the laminated electronic component 1 or to provide the laminated electronic component 1 with a mounting property, which respectively include solder barrier layers 14 and 15 preferably composed of, for example, a plating layer primarily include nickel, and solderability providing layers 16 and 17 preferably composed of, for example, a plating layer primarily including tin or gold and formed on the solder barrier layers 14 and 15 so as to provide solderability. It is to be noted that the plating primarily including tin described above also preferably includes, for example, Sn—Pb solder plating. In addition, the plating primarily including nickel also preferably includes Ni—P plating by electroless plating.

Further, in the case where the first plating layers 10 and 11 are composed of a plating layer primarily including copper as described above, the favorable throwing power of copper can improve the efficiency of the plating process and increase the fixing strength of the external terminal electrodes 8 and 9. Alternatively, the first plating layers 10 and 11 may be composed of nickel, for example, and the second plating layers 12 and 13 may be composed of tin or gold, for example.

The plating method for forming the first plating layers 10 and 11 and the second plating layers 12 and 13 may preferably be electroless plating for depositing metal ions with the use of a reducing agent, or electroplating through an electrifying process.

In each of the external terminal electrodes 8 and 9, a water repellent film 18 is formed between the first plating layers 10 and 11 and the second plating layers 12 and 13. While the type of water repellent used to form the water repellent film is not particularly limited as long as the water repellent prevents the plating solution or moisture from entering, a silane coupler, for example, is preferably used. It is to be noted that the water repellent film 18 is magnified in thickness in FIG. 1, and it should be understood that the water repellent film 18 is actually not as thick as shown in FIG. 1.

Next, a method for manufacturing the laminated electronic component 1 shown in FIG. 1, in particular, a method for forming the external terminal electrodes 8 and 9 will be described.

First, the component main body 2 is manufactured by a well known method. Next, the external terminal electrodes 8 and 9 are formed on the end surfaces 6 and 7 of the component main body 2 so as to be electrically connected to the internal electrodes 3 and 4.

For the formation of the external terminal electrodes 8 and 9, the first plating layers 10 and 11 are formed on the end surfaces 6 and 7 of the component main body 2. In the component main body 2 before being plated, the plurality of internal electrodes 3 exposed at one end surface 6 are electrically insulated from each other, and the plurality of internal electrodes 4 exposed at the other end surface 7 are electrically insulated from each other. In order to form the first plating layers 10 and 11, metal ions in a plating solution are first deposited onto the sections of each of the exposed internal electrodes 3 and 4. Then, the plated depositions are further grown to physically connect the plated depositions on the respective sections of the adjacent exposed internal electrodes 3 and the plated depositions on the respective sections of the adjacent exposed internal electrodes 4. In this manner, uniform and dense first plating layers 10 and 11 are formed.

In this preferred embodiment, the component main body 2 of the laminated electronic component 1 preferably has a substantially rectangular parallelepiped shape while including a pair of principal surfaces 19 and 20 opposed to each other and a pair of side surfaces opposed to each other (not shown in FIG. 1) in addition to the pair of end surfaces 6 and 7 described above. Further, the first plating layers 10 and 11 described above are respectively formed on the pair of end surfaces 6 and 7 so that the end edges of the first plating layers 10 and 11 are located on the pair of principal surfaces 19 and 20 and the pair of side surfaces, which are adjacent to the end surfaces 6 and 7.

In order to allow the first plating layers 10 and 11 to be formed efficiently so that the end edges of the first plating layers 10 and 11 extend to the pair of principal surfaces 19 and the pair of side surfaces as described above, it is preferable to form internal dummy conductors 21 and 22 on an outer layer section of the component main body 2 so as to be exposed at the end surfaces 6 and 7 and to form external dummy conductors 23 and 24 on ends of the principal surfaces 19 and 20 of the component main body 2, which are adjacent to the end surfaces 6 and 7. The internal dummy conductors 21 and 22 and the external dummy conductors 23 and 24 do not substantially contribute to the electrical characteristics, but function to cause deposition of metal ions for the formation of the first plating layers 10 and 11 as well as to promote the plating growth.

Furthermore, in order to adequately expose the internal electrodes 3 and 4 and the internal dummy conductors 21 and 22 at the end surfaces 6 and 7 before the plating step described above, it is preferable to polish the end surfaces 6 and 7 of the component main body 2. In this case, if polishing is performed to the extent that the respective exposed ends of the internal electrodes 3 and 4 and the internal dummy conductors 21 and 22 project from the end surfaces 6 and 7, the respective exposed edges will be spread in a planar direction, thereby reducing the energy required for the plating growth.

Figure 2:
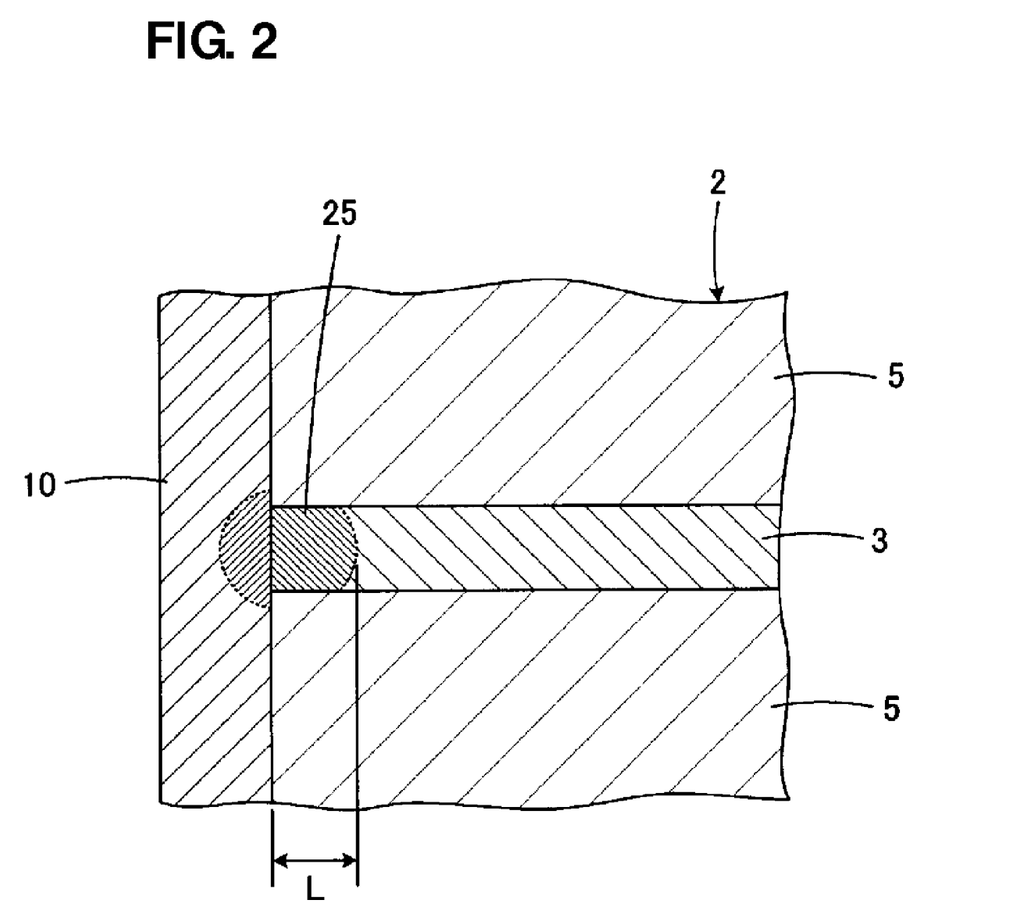
FIG. 2 is an enlarged cross-sectional view illustrating a section of a component main body provided with a first plating layer thereon and then subjected to a heat treatment for the purpose of forming an external terminal electrode, in the course of a manufacturing process of the laminated electronic component shown in FIG. 1.

Next, the component main body 2 with the first plating layers 10 and 11 formed thereon as described above is preferably subjected to a heat treatment. As a heat treatment temperature, for example, a temperature of about 600° C. or more, and preferably about 800° C. or more, for example, is used. The state after this heat treatment is shown in FIG. 2. FIG. 2 shows the internal electrode 3 and the first plating layer 10. The structure on the side of the internal electrode 4 and the first plating layer 11 not shown in FIG. 2 is substantially the same as the structure on the side of the internal electrode 3 and the first plating layer 10 shown in FIG. 2, and description of the structure on the side of the internal electrode 4 and the first plating layer 11 will not be provided.

Referring to FIG. 2, an interdiffusion layer 25 is formed between the internal electrode 3 and the first plating layer 10. The interdiffusion layer 25 is preferably provided in a region with a length L of about 2 µm or more, for example, from the boundary between the internal electrode 3 and the first plating layer 10. In other words, the heat treatment is preferably performed under a condition such that the length L is about 2 µm or more, for example. Such formation of the interdiffusion layer 25 further improves the effect of preventing moisture from entering the inside of the component main body 2.

Next, in order to form the water repellent film 18 described above, a step of applying a water repellent is performed. It is enough to apply the water repellent at least onto the surfaces of the first plating layers 10 and 11 and onto sections in the external surface of the component main body 2, at which respective end edges of the first plating layers 10 and 11 are located. However, in this preferred embodiment, the water repellent is preferably applied onto the entire surface of the component main body 2 with the first plating layers 10 and 11 formed thereon since the method of immersing the component main body 2 in a solution containing the water repellent is used for application of the water repellent. It is to be noted that other methods, such as spraying, for example, may be used to apply the water repellent.

The water repellent film 18 is uniformly formed in a relatively thin film on the first plating layers 10 and 11. As a result, the water repellent adheres to the principal surfaces 19 and 20 of the component main body 2 as well as to sections A at which the end edges of the first plating layers 10 and 11 are located on the side surfaces. This adhesion functions to more effectively prevent moisture from entering through the gaps between the end edges of the first plating layers 10 and 11 and the principal surfaces 19 and 20 as well as the side surfaces.

Next, the second plating layers 12 and 13 are formed. The second plating layers 12 and 13 are formed after the formation of the first plating layers 10 and 11, and thus can be easily formed by an ordinary method. This is because locations to be plated have a conductive and continuous surface when the second plating layers 12 and 13 are formed. It is to be noted that, while the water repellent film 18 is formed on the first plating layers 10 and 11 as described above, the water repellent film 18 is thin and uniform and, thus, the problem of inhibiting the deposition of the second plating layers 12 and 13 due to the water repellent film 18 is not likely to occur.

When a silane coupler is used as the water repellent as described above, the silane coupler preferably adheres to the ceramic surface because the silane coupler is strongly bonded to OH groups. On the other hand, a thin and uniform natural oxidation film is present on the surfaces of the first plating layers 10 and 11, thus allowing the water repellent film 18 to be uniformly formed as a thin film on the natural oxidation film.

In this preferred embodiment, in order to form the second plating layers 12 and 13, the step of forming the barrier layers 14 and 15 preferably composed of, for example, nickel, and the step of forming the solderability providing layers 16 and 17 preferably composed of, for example, tin or gold are sequentially performed.

Next, a non-limiting experimental example will be described, which was performed to confirm the advantageous effects of preferred embodiments of the present invention.

In this experimental example, a laminated ceramic capacitor as a sample was manufactured using the following steps:

(1) preparation of a component main body
(2) electrolytic copper plating
(3) heat treatment
(4) application of a water repellent
(5) electrolytic nickel plating
(6) electrolytic tin plating It is to be noted that cleaning with pure water was performed after each of the plating steps (2), (5), and (6).

Details of each of the steps (1) to (6) are described as follows.

(1) Preparation of Component Main Body

A component main body with a length of 0.94 mm, a width of 0.47 mm, and a height of 0.47 mm, for example, for a laminated ceramic capacitor was prepared in which insulator layers were composed of a barium titanate based dielectric ceramic, internal electrodes primarily including nickel, the insulator layer between the adjacent internal electrodes had a thickness of 1.5 μm, and the number of the laminated internal electrodes was 220. Furthermore, this component main body was provided with internal dummy conductors and external dummy conductors.

(2) Electrolytic Copper Plating

As plating baths, a copper strike bath shown in Table 1 below and a thick copper bath shown in Table 2 were prepared.

TABLE 1

| | Copper Strike Bath | |
|---|---|---|
| Plating Bath | copper pyrophosphate | 14 g/liter |
| | pyrophosphoric acid | 120 g/liter |
| | potassium oxalate | 10 g/liter |
| | pH | 8.7 |
| | Bath Temperature | 25° C. |

TABLE 2

| | Thick Copper Bath | |
|---|---|---|
| Plating Bath | Pyro-Bright Process from C.Uyemura & Co., Ltd. | |
| | pH | 8.6 |
| | Bath Temperature | 55° C. |

Into a 300 ml horizontal rotating barrel, 500 pieces of the component main bodies were input, and in addition, 100 ml of conductive media having 0.7 mm in diameter were input. Then, the horizontal rotating barrel was immersed in the copper strike bath shown in Table 1, and an electric current was applied at a current density of 0.10 A/dm$^2$ while rotating the horizontal rotating barrel at a barrel peripheral velocity of 2.6 m/minute, thereby performing copper strike plating until a film thickness became 1 μm.

Then, the same horizontal rotating barrel was immersed in the thick copper bath shown in Table 2, and an electric current was applied at a current density of 0.30 A/dm$^2$ while rotating the horizontal rotating barrel at the same barrel peripheral velocity, thereby performing thick copper plating until a film thickness became 5 μm.

(3) Heat Treatment

The component main body with the copper plating layers formed as described above was subjected to a heat treatment at a temperature of 800° C. for 5 minutes.

(4) Application of Water Repellent

Next, the component main body subjected to the heat treatment was immersed in a liquid containing a water repellent as shown in Table 3 at room temperature for 5 minutes to apply the water repellent.

TABLE 3

| Sample No. | Water Repellent |
|---|---|
| 1 | $(CH_3O)_3$—Si—$(CH_2)_9$—$CH_3$ |
| 2 | $(CH_3O)_3$—Si—$CH_3$ |
| 3 | $(CH_3O)_3$—Si—$(CH_2)_3$—$NH_2$ |
| 4 | $(CH_3O)_3$—Si—$CH_2CH_2C_8F_{17}$ |
| 5 | NK Guard FGN-37 (from NICCA CHEMICAL CO., LTD.) |
| 6 | Not Treated |
| 7 | water repellent for Sample 1 applied after tin plating |

In Table 3, samples 6 and 7 are used in comparative examples outside of the scope of the present invention.

The water repellents for samples 1 to 4 were used after being diluted to 3 weight % with the use of IPA, and drying after the immersion was performed at a temperature of 150° C. for 30 minutes. Regarding the water repellent for sample 5, an undiluted solution was used, and drying after the immersion was performed at 105° C. for 15 minutes and at 180° C. for 1 minute.

For sample 7 in a comparative example, the water repellent for sample 1 was used and provided after tin plating to be described later, instead of after copper plating described above.

(5) Electrolytic Nickel Plating

Next, a Watts bath (weakly acid nickel bath) was used and set at a temperature of 60° C. and at pH 4.2 to perform electroplating at a current density of 0.20 A/dm$^2$ for 60 minutes, thereby forming a nickel plating layer having a thickness of about 4 μm on the copper plating layer.

(6) Electrolytic Tin Plating

Next, NB-RZS from Ishihara Chemical Co., Ltd. was used as a plating bath and set at a temperature of 30° C. and at pH 4.5 to perform electroplating at a current density of 0.10 A/dm$^2$ for minutes, thereby forming a tin plating layer having a thickness of about 4 μm on the nickel plating layer.

For laminated ceramic capacitors obtained from the respective samples, a humidity-proof reliability test (temperature: 125° C., relative humidity: 95%, applied voltage: 6.3 V) was performed. Then, where the insulation resistance after a lapse of 144 hours was 1 MΩ or less, such samples were regarded as defective, and the number of defective samples was obtained out of 20 samples. The results are shown as "the number of defectives in reliability test" in Table 4.

TABLE 4

| Sample No. | The Number of Defectives in Reliability Test (out of 20 pieces) |
|---|---|
| 1 | 0 |
| 2 | 0 |
| 3 | 0 |
| 4 | 0 |
| 5 | 0 |
| 6 | 5 |
| 7 | 3 |

From Table 4, with respect to samples 1 to 5, no defective samples were found in the reliability test. In contrast, five and three defective samples were generated with respect to samples 6 and 7, respectively. From the result of analyzing samples 6 and 7, it was confirmed that sealing is insufficient at end edges of the copper plating layer located on the principal surfaces and side surfaces of the component main body, resulting in the entry of the plating solution from the end edges.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A method for manufacturing a laminated electronic component, the method comprising the steps of:
   preparing a component main body having a laminated structure, the component main body including a plurality of internal electrodes formed therein, and each of the internal electrodes being partially exposed on an external surface of the component main body; and
   forming an external terminal electrode on the external surface of the component main body such that the external terminal electrode is electrically connected to the internal electrodes; wherein
   the step of forming the external terminal electrode includes the steps of:
      forming a first plating layer on exposed surfaces of the internal electrodes in the component main body;
      applying a water repellant at least on a surface of the first plating layer and on a section of the external surface of the component main body at which an end edge of the first plating layer is located; and then
      forming a second plating layer on the first plating layer having the water repellant applied thereon.

2. The method for manufacturing a laminated electronic component according to claim 1, wherein the step of forming the external terminal electrode further includes the step of subjecting the component main body having the first plating layer formed thereon to a heat treatment, between the step of forming the first plating layer and the step of applying the water repellant.

3. The method for manufacturing a laminated electronic component according to claim 1, wherein the step of forming the first plating layer includes the step of forming a plating layer primarily including copper, and the step of forming the second plating layer includes the step of forming a plating layer primarily including nickel and subsequently the step of forming a plating layer primarily including tin or gold.

4. The method for manufacturing a laminated electronic component according to claim 1, wherein
   the component main body has a substantially rectangular parallelepiped shape having a pair of principal surfaces opposed to each other, a pair of side surfaces opposed to each other, and a pair of end surfaces opposed to each other, the internal electrodes being at least partially exposed at the end surfaces; and
   in the step of forming the first plating layer, the first plating layer is formed on the end surfaces such that end edges of the first plating layer are located on the principal surfaces and the side surfaces, which are adjacent to the end surfaces.

5. A laminated electronic component comprising:
   a component main body having a laminated structure, the component main body including a plurality of internal electrodes provided therein, and the internal electrodes each being partially exposed on an external surface of the component main body; and
   an external terminal electrode arranged on the external surface of the component main body such that the external terminal electrode is electrically connected to the internal electrodes; wherein
   the external terminal electrode includes a first plating layer provided on exposed surfaces of the internal electrodes of the component main body, a second plating layer provided on the first plating layer, and a water repellent film provided between the first plating layer and the second plating layer.

6. The laminated electronic component according to claim 5, wherein an interdiffusion layer is provided in a region in the internal electrode with a length of about 2 μm or more from a boundary of the first plating layer.

7. The laminated electronic component according to claim 5, wherein the first plating layer includes a plating layer primarily including copper, and the second plating layer includes a plating layer primarily including nickel and a plating layer thereon primarily including tin or gold.

8. The laminated electronic component according to claim 5, wherein
   the component main body has a substantially rectangular parallelepiped shape including a pair of principal surfaces opposed to each other, a pair of side surfaces opposed to each other, and a pair of end surfaces opposed to each other, the internal electrodes being at least partially exposed at the end surfaces; and
   the first plating layer is arranged on the end surfaces such that end edges of the first plating layer are located on the principal surfaces and the side surfaces, which are adjacent to the end surfaces.

* * * * *